US012668647B2

(12) United States Patent
Buryak et al.

(10) Patent No.: US 12,668,647 B2
(45) Date of Patent: Jun. 30, 2026

(54) POLYETHYLENE PIPE RESIN WITH HIGH RESISTANCE TO SLOW CRACK GROWTH

(71) Applicant: Borealis AG, Vienna (AT)

(72) Inventors: Andrey Buryak, Linz (AT); Victor Sumerin, Kulloo (FI); Franz Ruemer, Linz (AT); Jari Aarila, Kulloo (FI); Joy Jie Cheng, Linz (AT)

(73) Assignee: BOREALIS GMBH, Vienna (AT)

( * ) Notice: Subject to any disclaimer, the term of this patent is extended or adjusted under 35 U.S.C. 154(b) by 608 days.

(21) Appl. No.: 18/014,219

(22) PCT Filed: Jul. 7, 2021

(86) PCT No.: PCT/EP2021/068868
§ 371 (c)(1),
(2) Date: Jan. 3, 2023

(87) PCT Pub. No.: WO2022/008607
PCT Pub. Date: Jan. 13, 2022

(65) Prior Publication Data
US 2023/0257489 A1     Aug. 17, 2023

(30) Foreign Application Priority Data

Jul. 10, 2020    (EP) ..................................... 20185204

(51) Int. Cl.
| | |
|---|---|
| *C08F 10/02* | (2006.01) |
| *C08F 2/00* | (2006.01) |
| *C08F 210/14* | (2006.01) |
| *C08K 3/04* | (2006.01) |
| *C08L 23/0807* | (2025.01) |

(52) U.S. Cl.
CPC .............. *C08F 10/02* (2013.01); *C08F 2/001* (2013.01); *C08F 210/14* (2013.01); *C08K 3/04* (2013.01); *C08L 23/0815* (2013.01); *C08K 2201/019* (2013.01); *C08L 2203/18* (2013.01); *C08L 2314/02* (2013.01)

(58) Field of Classification Search
CPC ........ C08F 10/02; C08F 2/001; C08F 210/14; F16L 9/12; C08K 2201/019; C08K 3/04; C08L 2314/02; C08L 2205/025; C08L 23/0815
See application file for complete search history.

(56) References Cited

U.S. PATENT DOCUMENTS

| | | | |
|---|---|---|---|
| 9,783,662 B2 | 10/2017 | Wang et al. | |
| 2003/0096901 A1 * | 5/2003 | Aarila ................ | C08L 23/0815 |
| | | | 524/528 |
| 2004/0034169 A1 * | 2/2004 | Zhou ................... | C08L 23/0815 |
| | | | 525/240 |
| 2007/0273066 A1 * | 11/2007 | Johansson ........... | C08L 23/0807 |
| | | | 526/183 |
| 2007/0282067 A1 * | 12/2007 | Backman ............... | C08L 23/04 |
| | | | 525/95 |
| 2016/0064984 A1 | 3/2016 | Suda et al. | |
| 2016/0312017 A1 * | 10/2016 | Hedesiu .............. | C08L 23/0815 |
| 2017/0002187 A1 * | 1/2017 | Tynys ....................... | F16L 9/12 |

FOREIGN PATENT DOCUMENTS

| | | | | |
|---|---|---|---|---|
| CN | 104024325 | A | 9/2014 | |
| CN | 105683279 | A | 6/2016 | |
| EP | 1985660 | A1 | 3/2000 | |
| EP | 1655333 | A1 | 5/2005 | |
| EP | 2860201 | A1 | 4/2015 | |
| EP | 2860202 | B1 | 4/2015 | |
| EP | 3176213 | A1 | 6/2017 | |
| EP | 3293208 | A1 | 3/2018 | |
| WO | WO-2017207493 | A1 * | 12/2017 | ........... C08F 4/6494 |
| WO | 2020068413 | A1 | 4/2020 | |

OTHER PUBLICATIONS

United Arab Emirates Office Action Summary for Application No. P6000026/20233 Dated: Dec. 17, 2024.
Russian Search Report for Application 2023102867/04 (006120) Date: Nov. 7, 2023.
International Search Report of Application No. PCT/EP2021/068868 dated Oct. 6, 2021.
Borsafe HE3490-LS-H Black High Density Polyethylene compound for pressure pipes.
Expert Declaration by Andreas Albrecht.
Expert Declaration by Thipaya Pathawi-Isriyakul (with English Translation).

* cited by examiner

*Primary Examiner* — Robert C Boyle
(74) *Attorney, Agent, or Firm* — Lippes Mathias LLP

(57) ABSTRACT

The present invention relates to a polyethylene composition comprising a base resin which comprises (A) a first ethylene homo- or copolymer fraction, and (B) a second ethylene-hexene-1 copolymer fraction, wherein fraction (A) has a lower molecular weight than fraction (B) and wherein fraction (B) is present in an amount of from 51.0 to 58.5 wt. %, preferably 52.0 to 57.5 wt. %, more preferably 53.0 to 57.0 wt. % based on the total weight of the base resin, wherein fraction (B) of the base resin has a content of units derived from hexene-1 from 0.80 to 1.45 mol %, preferably of from 0.82 to 1.35 mol % and more preferably of from 0.85 to 1.30 mol %, wherein the base resin has a number average molecular weight Mn of 8,500 g/mol or higher, and wherein the polyethylene composition has a melt flow rate MFRs from 0.10 to 0.30 g/10 min, preferably from 0.15 to 0.28, and still more preferably from 0.16 to 0.25 g/10 min, to a process for producing the polyethylene composition, to an article, especially a pipe comprising the polyethylene composition and to the use of the polyethylene composition for the production of an article, especially a pipe.

20 Claims, No Drawings

POLYETHYLENE PIPE RESIN WITH HIGH RESISTANCE TO SLOW CRACK GROWTH

CROSS REFERENCE TO RELATED APPLICATIONS

This is a 371 of PCT Application No. PCT/EP2021/068868, filed Jul. 7, 2021, which claims the benefit of European Application No. 20185204.3, filed Jul. 10, 2020, the contents of which are incorporated herein in their entirety.

BACKGROUND

The present invention relates to a multimodal polyethylene composition for the production of a high-pressure pipe, to a process for obtaining the composition, to an article, especially a pipe, comprising the composition.

Polyolefin pipes and especially polyethylene pipes are conventionally used for transport of water, gas as well as industrial liquids and slurries. Due to their versatility, ease of production and installation as well as non-corrosivity, their use is constantly increasing.

New installation techniques, such as trenchless and sand bed-free installation, demand polyethylene pipe resins with higher and higher resistance to slow crack growth. The requirements for slow crack growth become more and more stringent and many of the existing products fail to consistently meet those requirements. At the same time, there is the need to improve the impact resistance of the HDPE pipe resins in order to avoid pipelines' failure by rapid crack propagation.

Depending on the pressure pipes made from a polyethylene composition can withstand at 20° C. over 50 years lifetime, the compositions are classified for example as PE80 or PE100.

According to ISO 9080 polyethylene pipes are classified by their minimum required strength, i.e. their capability to withstand different hoop stresses during 50 years at 20° C. without fracturing. Thereby, pipes withstanding a hoop stress of 8.0 MPa ($\text{MRS}_{8.0}$) are classified as PE80 pipes, and pipes withstanding a hoop stress of 10.0 MPa ($\text{MRS}_{10.0}$) are classified as PE100 pipes. The service temperature for PE100 is usually within the temperature range from about 0° C. to about 50° C.

To meet the PE80 requirements with multimodal resins manufactured by conventional Ziegler-Natta catalysts, the density needs to be at least 940 kg/m³ and to meet PE100 requirements the density needs to be above 945 kg/m³. However, the density of a polyethylene resin is directly connected with its crystallinity. The higher the crystallinity of a polyethylene resin the lower its slow crack growth resistance. In other words, all polyethylene materials for pressure resistance of a pipe suffer from the dependency of crystallinity and insofar density and the slow crack growth. When the density is increased, the resistance to slow crack growth (SCG) decreases.

The manufacture of polyethylene materials to be used in pressure pipes is discussed for example in an article by Scheirs et al (Scheirs, Bohm, Boot and Leevers: PE100 Resins for Pipe Applications, TRIP Vol. 4, No 12 (1996) pp. 408-415).

WO 00/22040 discloses a pipe having good mechanical properties made from a bimodal resin. EP 1 985 660 A1 discloses a pipe or a supplementary pipe article with improved slow crack growth resistance comprising a polyethylene composition comprising a base resin, which comprises a first ethylene homo- or copolymer fraction (A), and a second ethylene homo- or copolymer fraction (B), wherein fraction (A) has a lower average molecular weight than fraction (B), and wherein the base resin has a density in the range of 945 to 949 kg/m³, an $\text{MFR}_5$ in the range of 0.2 to 0.4 g/10 min., a comonomer content of higher than 2.0 wt.-% and a $\text{SHI}_{(2.7/210)}$ in the range of 55 to 100.

It is an object of the present invention to provide a polyethylene pipe material which meets the requirements for a PE100 resin and, at the same time, has a combination of an improved slow crack growth resistance, a very good rapid crack propagation resistance and a very good impact resistance.

BRIEF SUMMARY

The present invention is based on the surprising finding that such a pipe material can be provided by a selecting a specific combination of the properties of a multimodal polyethylene base resin in terms of a high number average molecular weight, a selected hexene comonomer content in the high Mw fraction, and a selected amount of the high Mw fraction.

The present invention therefore provides a polyethylene composition comprising a base resin which comprises (A) a first ethylene homo- or copolymer fraction, and (B) a second ethylene-hexene-1 copolymer fraction, wherein fraction (A) has a lower molecular weight than fraction (B) and wherein fraction (B) is present in an amount of from 51.0 to 58.5 wt. %, preferably 52.0 to 57.5 wt. %, more preferably 53.0 to 57.0 wt. % based on the total weight of the base resin, wherein fraction (B) of the base resin has a content of units derived from hexene-1 from 0.80 to 1.45 mol %, preferably of from 0.82 to 1.35 mol % and more preferably of from 0.85 to 1.30 mol %, wherein the base resin has a number average molecular weight Mn of 8,500 g/mol or higher, and wherein the polyethylene composition has a melt flow rate $\text{MFR}_5$ from 0.10 to 0.30 g/10 min, preferably from 0.15 to 0.28, and still more preferably from 0.16 to 0.25 g/10 min.

The polyethylene composition of the invention due to its combination of design parameters allows to achieve excellent resistance to slow crack growth combined with very good impact resistance and very low critical temperature in rapid crack propagation tests, while still meeting all other requirements of a PE100 resin.

DETAILED DESCRIPTION

The expression 'ethylene homopolymer' according to the present invention relates to an ethylene polymer that consists substantially, i.e. to least 99% by weight, more preferably at least 99.5% by weight, still more preferably at least 99.8% by weight of ethylene an most preferably is an ethylene polymer which only includes ethylene monomer units.

The term 'base resin' means the entirety of polymeric components in the polyethylene composition according to the invention, i.e. it denotes the polymeric part of the composition without fillers such as carbon black. The base resin usually is making up at least 90 wt. % of the total composition. Preferably, the base resin is consisting of polymer fractions (A) and (B), optionally further comprising a prepolymer fraction in an amount of up to 10 wt. %, more preferably up to 7 wt. %, and most preferably up to 5 wt. % of the total base resin. A person skilled in the art will understand that measurements as to properties of the base resin require the presence of stabilizers.

The slow crack resistance of a pipe material is imparted to the material by the base resin, and can, for example, be tested by the strain hardening behavior of the resin.

In a preferred embodiment, the polyethylene composition has a strain hardening modulus of 80 MPa or higher, more preferably has a strain hardening modulus of 85 or higher, still more preferably has a strain hardening modulus of 88 or higher, and most preferably has a strain hardening modulus of 90 or higher.

The polyethylene composition usually has a strain hardening modulus of not more than 110 MPa or of not more than 105 MPa.

It is further important to ensure that the polymer composition, for example, after being extruded into a pipe and before being cooled, does not flow by gravity from the upper part of the pipe to a lower part and therefore create a non-uniform distribution of polymer around the cross-section of the pipe. This phenomenon is called tendency of a polymer to display gravity flow or 'sagging'. The sagging resistance is the property of a polymer pipe to withstand this tendency. Sagging resistance may be determined by a rheological or a melt index method.

The determination is done in the present invention by a method which correlates well with the above mentioned melt index method, and relates to the rheology of the polymer. The method is based on determination of the viscosity of the polymer at a very low, constant shear stress of 747 Pa (eta$_{747}$), as described in detail below. The viscosity of the polymer at this shear stress is determined at a temperature of 190° C. and has been found to be inversely proportional to the gravity flow of the polymer, i.e. the greater the viscosity the lower the gravity flow. According to the present invention the polyethylene composition preferably exhibits a viscosity at eta$_{747}$ of at least 250 kPa*s, preferably at least 275 kPa*s, even more preferably at least 300 kPa*s.

Usually, the polyethylene composition has an eta$_{747}$ of 250 to 750 kPa*s, more preferably of 275 to 725 kPa*s, and most preferably of 300 to 700 kPa*s.

The base resin preferably has a number average molecular weight Mn of 8,700 g/mol or higher, more preferably of 8,900 g/mol or higher and most preferably of 9,000 g/mol or higher To fulfill the requirements for a PE100 pipe material, the density of the base resin is preferably at least 945 kg/m$^3$, more preferably of from 945 to 951 kg/m$^3$.

The base resin preferably has a content of units derived from hexene-1 of 0.44 to 0.70 mol %, more preferably of 0.45 to 0.69 mol % and still more preferably of 0.47 to 0.67 mol %.

The polyethylene composition of the invention has a very good impact strength which can be measured in the Charpy Impact Strength test as described in detail below at different temperatures.

Accordingly, the polyethylene composition preferably has a Charpy Impact Strength (CIS) at 23° C. of higher than 35 kJ/m$^2$, more preferably of higher than 40 kJ/m$^2$, and/or a Charpy Impact Strength (CIS) at 0° C. of higher than 22.5 kJ/m$^2$, more preferably of higher than 25 kJ/m$^2$, and/or a Charpy Impact Strength (CIS) at −20° C. of higher than 14.7 kJ/m$^2$, more preferably of higher than 15 kJ/m$^2$.

Fraction (A) of the base resin may be an ethylene homo- or copolymer.

If fraction (A) is an ethylene copolymer, it is preferably a copolymer of ethylene with an alpha-olefin having from 3 to 8 carbon atoms, more preferably 4 to 6 carbon atoms, and most preferably is butene-1 or hexene-1.

Preferably, the amount of comonomer, if present, in fraction (A) is 1 mol % or smaller, e.g. from 0.1 to 0.5 mol %.

However, preferably fraction (A) of the base resin is an ethylene homopolymer. Fraction (A) preferably has a density of 960 to 980 kg/m$^3$.

Furthermore, preferably, fraction (A) of the base resin has an MFR$_2$ as measured in accordance with ISO 1133 of 150 to 600 g/10 min, more preferably of 175 to 550 g/10 min and most preferably of 200 to 550 g/10 min.

Fraction (A) and/or fraction (B) may consist of a single polymer fraction made in one reactor, or may consists of two or more partial fractions made in separate reactors.

It is preferred that fraction (A) and/or fraction (B) consist of two partial fractions or a single fraction.

Most preferably, fraction (A) consists of one single fraction or two partial fractions, preferably produced in one or two loop reactors, respectively, and fraction (B) consists of one single fraction, preferably produced in a gas phase reactor.

The base resin of the polyethylene composition of the present invention comprises fractions (A) and (B) which differ (at least) in their molecular weight. Such resins are designated to be multimodal polyethylenes. The prefix "multi" relates to the number of different polymer fractions the base resin is consisting of. Thus, for example, a base resin consisting of two different fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

It is preferred in the present invention that the base resin is a bimodal polyethylene base resin, i.e. the base resin preferably consists of fractions (A) and (B) and, optionally, a small amount of a prepolymer which is considered a part of the polymer fraction produced in the first reactor.

If one or more fractions of the base resin consist of partial fractions produced in separate reactors, it is preferred that the reaction conditions are chosen so that essential the same polymer is produced therein. This means that if, for example and preferably, the base resin consists of fraction (A) and (B) and fraction (A) is produced as two partial fractions in two separate loop reactors under conditions so that essentially the same or the same polymer is produced therein, the base resin will still be a bimodal resin as it consists of two fractions of different polymers.

Furthermore, in the polyethylene composition the base resin has a weight average molecular weight Mw 150,000 to 350,000 g/mol, preferably of 200,000 to 320,000 g/mol.

The base resin preferably has a molecular weight distribution Mw/Mn of from 20 to 35, preferably from 22 to 31.

The polyethylene composition according to the invention has a very good resistance to rapid crack propagation. Accordingly, the composition preferably has a critical temperature Tc in the rapid crack propagation (S4 test) of −10° C. or lower.

Furthermore, the polyethylene composition according to invention preferably has a time to failure in the short term pressure resistance (STPR) test at a stress level of 12.0 MPa at 20° C. of at least 100 h.

Still further, the polyethylene composition preferably has a time to failure in the accelerated point loading test using a 32 mm diameter SDR11 pipe of at least 1,000 h, more preferably at least 1,500 h, and or has a time to failure in the accelerated point loading test using a 110 mm diameter SDR pipe of at least 1,000 h, more preferably at least 1,500 h.

The polyethylene composition of the invention preferably has a time to failure in the ACT test of at least 2,000 h.

In addition to the base resin, usual additives for utilization with polyolefins, such as pigments, stabilizers (antioxidant agents), antiacids and/or anti-UVs, antistatic agents and utilization agents (such as processing aid agents) may be present in the polyethylene composition. Preferably, the amount of these additives is 10 wt. % or below, further preferred 8 wt. % or below, still more preferred 5 wt. % or below, and still more preferred 4 wt. % or below of the total composition.

Preferably, the base resin makes up at least 90 wt. %, more preferably at least 92, and still more preferably at least 93 wt. % of the polyethylene composition.

In one embodiment of the present invention, the polyethylene composition of the invention comprises carbon black. Carbon black imparts black colour to the polyethylene composition and, at the same time, protects the composition from UV radiation. Still further, the addition of carbon black increases the density of the polyethylene composition compared to that of the base resin.

All embodiments and preferred embodiments as described hereinabove for the base resin and for the polyethylene composition apply also to the polyethylene composition comprising carbon black. Furthermore, the following preferred embodiments apply to the polyethylene composition comprising carbon black in addition.

In this embodiment, it is preferred that the polyethylene composition consists of the base resin, carbon black, further (usual) additives in any one of the amounts as herein described and optionally any carrier material used to compound the base resin with the pigment(s)/additives. The further additives preferably are present in amount of 3 wt. % or less, more preferred of 2.5 wt. % or less, and most preferred of 2 wt. % or less.

Preferably, carbon black is present in the polyethylene composition in an amount of 8 wt. % or below, further preferred of 1 to 4 wt. %, even more preferred of 2.0 to 2.5 wt. % of the total composition.

Usually, the amount of carbon black added is selected so that the density of the carbon black-containing polyethylene composition is from 8 to 15 kg/m³, more preferably from 9 to 14 kg/m³ higher than that of the base resin.

It is preferred that the polyethylene composition comprising carbon black has a density of from 953 to 965 kg/m³, more preferably from 954 to 960 kg/m³, and most preferably from 955 to 959 kg/m³.

Carbon black is usually added in the form of a master batch, i.e. as a mixture of e.g. an HDPE and carbon black, in which carbon black is present in an amount of e.g. 30 to 50 wt. %.

Preferably, in the polyethylene composition comprising carbon black fraction (B) is present in the base resin in an amount of from 54 to 57 wt. %, preferably 54.2 to 56.8 wt. %, more preferably 54.5 to 56.6 wt. % based on the total weight of the base resin.

Furthermore, preferably in the polyethylene composition comprising carbon black fraction (B) of the base resin has a content of units derived from hexene-1 from 0.9 to 1.45 mol %, more preferred of 0.95 to 1.30 mol %, still more preferably of 1.0 to 1.25 mol %, still more preferably of from 1.03 to 1.24 mol % and most preferably of from 1.04 to 1.23 mol %.

Still further, preferably in the polyethylene composition comprising carbon black the base resin has a number average molecular weight of 9,000 g/mol or higher, preferably of 9,300 g/mol or higher.

It is preferred that in the polyethylene composition comprising carbon black the base resin has a total content of units derived from hexene-1 of 0.50 to 0.70 mol %, preferably of 0.52 to 0.69 mol % and more preferably of 0.54 to 0.67 mol %.

Furthermore, the polyethylene composition comprising carbon black preferably has a time to failure in the short term pressure resistance (STPR) test at a stress level of 12.0 MPa at 20° C. of at least 150 h.

In a further embodiment of the present invention the polyethylene composition does not comprise carbon black.

The polyethylene composition in this embodiment may either comprise no pigment at all, or may comprise a pigment different from carbon black such as a blue or orange pigment.

All embodiments and preferred embodiments as described hereinabove for the base resin and for the polyethylene composition, apart from those described for the polyethylene composition comprising carbon black, apply also to the polyethylene composition not comprising carbon black. Furthermore, the following preferred embodiments apply to the polyethylene composition not comprising carbon black in addition.

In this embodiment, it is preferred that the polyethylene composition consists of the base resin, optionally one or more pigment(s), further (usual) additives in any one of the amounts as herein described, and optionally any carrier material used to compound the base resin with the pigment(s)/additives. The further additives preferably are present in amount of 3 wt. % or less, more preferred of 2.5 wt. % or less, and most preferred of 2 wt. % or less.

Preferably, the total amount of pigments different form carbon black present in the polyethylene composition is 2 wt. % or below, further preferred is 0.05 to 1 wt. %, of the total composition.

Exemplary pigments and the color imparted to the polyethylene composition are in order to obtain an orange composition a mixture of pigments orange 72 and brown 24 (preferred weight ratio: 1:20) and in order to obtain a blue composition a mixture of pigments blue 29, blue 15:4 and white 6 (preferred weight ratio: 4:5:1).

A pigment or a mixture of pigments is usually added in the form of a master batch, i.e. as a mixture of e.g. an LDPE and the pigment(s), in which the pigment(s) is/are present in an amount of e.g. 5 to 50 wt. %.

Preferably in the polyethylene composition not comprising carbon black fraction (B) is present in the base resin in an amount of from in an amount of from 54 to 57 wt. %, preferably 54.2 to 56.8 wt. %, more preferably 54.5 to 56.6 wt. % based on the total weight of the base resin.

Furthermore, preferably in the polyethylene composition not comprising carbon black fraction (B) of the base resin has a content of units derived from hexene-1 from 0.8 to 1.35 mol %, more preferably of from 0.82 to 1.30 mol % and still more preferably of from 0.85 to 1.25 mol %.

Still further, preferably in the polyethylene composition not comprising carbon black the base resin has a content of units derived from hexene-1 of 0.44 to 0.65 mol %, preferably of 0.45 to 0.64 mol % and more preferably of 0.47 to 0.62 mol %.

Furthermore, it is preferred in this embodiment that the base resin has a number average molecular weight Mn of 9,300 g/mol or higher.

Still further, preferably in the polyethylene composition not comprising carbon black the base resin preferably has a density of at least 945 kg/m$^3$, more preferably of from 946 to 950 kg/m$^3$, and most preferably from 946.5 to 949 kg/m$^3$.

Furthermore, the polyethylene composition in this embodiment preferably has a density of from 946 to 955 kg/m$^3$, more preferably from 947 to 953 kg/m$^3$.

The present invention furthermore relates to a process for producing a polyethylene composition in any one of the above-described embodiments wherein the base resin is produced in a multistage polymerization process in the presence of a Ziegler-Natta catalyst.

A multi-stage process is a process which makes use of at least two reactors, one for producing a lower molecular weight component and a second for producing a higher molecular weight component. These reactors may be employed in parallel, in which case the components must be mixed after production. More commonly, the reactors are employed in series, such that the products of one reactor are used as the starting material in the next reactor, e.g. one component is formed in the first reactor and the second is formed in the second reactor in the presence of the first component. In this way, the two components are more intimately mixed, since one is formed in the presence of the other.

The polymerization reactions used in each stage may involve conventional ethylene homopolymerization or copolymerization reactions, e.g. gas phase, slurry phase, liquid phase polymerizations, using conventional reactors, e.g. loop reactors, gas phase reactors, batch reactors, etc.

The polymerization may be carried out continuously or batchwise, preferably the polymerization is carried out continuously.

Known two-stage processes are for instance liquid phase-liquid phase processes, gas phase-gas phase processes and liquid phase-gas phase processes. It is also known that these two-stage processes can further be combined with one or more additional polymerization steps selected from gas phase, slurry phase or liquid phase polymerization processes.

In the preferred multistage process, the lower molecular weight and higher molecular weight polymers, fractions (A) and (B), are produced in different polymerization steps, in any order.

The low molecular weight polymer (fraction (A)) can be prepared in the first polymerization step and the high molecular weight hexene-1 copolymer (fraction (B)) in the second polymerization step. This can be referred to as the normal mode and is preferred.

The HMW copolymer fraction (B) may also be prepared in the first polymerization step and the LMW polymer fraction (A) in the second polymerization step. This can be referred to as the reverse mode.

If the LMW fraction is produced in the first polymerization step, the melt flow rate of the first ethylene fraction (A) can be directly measured as described herein. If the LMW fraction is produced in the second polymerization step, the melt flow rate of the LMW ethylene fraction (A) can be calculated on the basis of the weight ratios of the LMW fraction and the HMW fraction and the molecular weight of the total polyethylene composition.

In addition, subtracting GPC curves, when fractions of each polymer are known is also possible for determining melt flow rate of the polymer produced in the second stage of a multi-stage polymerization process.

A two-stage process can, for example be a slurry-slurry or a gas phase-gas phase process, particularly preferably a slurry-gas phase process. Optionally, the process according to the invention can comprise one or two additional polymerization steps.

These optional one or two additional polymerization steps preferably comprise slurry polymerization steps.

The slurry and gas phase stages may be carried out using any conventional reactors known in the art. A slurry phase polymerization may, for example, be carried out in a continuously stirred tank reactor; a batch-wise operating stirred tank reactor or a loop reactor. Preferably slurry phase polymerization is carried out in a loop reactor. In such reactors the slurry is circulated with a high velocity along a closed pipe by using a circulation pump. Loop reactors are generally known in the art and examples are given, for instance, in U.S. Pat. Nos. 4,582,816 A, 3,405,109 A, 3,324,093 A, EP 479 186 A and U.S. Pat. No. 5,391,654 A.

The term gas phase reactor encompasses any mechanically mixed, fluidized bed reactor, fast fluidized bed reactor or settled bed reactor or gas phase reactors having two separate zones, for instance one fluidized bed combined with one settled bed zone. Preferably the gas phase reactor for the second polymerization step is a fluidized bed reactor.

In a preferred embodiment of the invention the LMW fraction is produced first and the HMW fraction is produced in the presence of LMW fraction.

The resulting end product consists of an intimate mixture of the polymer fractions from the reactors, the different molecular-weight-distribution curves of these polymers together forming a molecular-weight-distribution curve having a broad maximum or several maxima, i.e. the end product is a multimodal polymer mixture.

It is preferred that the multimodal base resin of the polyethylene composition according to the invention is a bimodal polyethylene mixture consisting of polymer fractions (A) and (B), optionally further comprising a small prepolymerization fraction. It is also preferred that this bimodal polymer mixture has been produced by polymerization as described above under different polymerization conditions in two or more polymerization reactors connected in series. Owing to the flexibility with respect to reaction conditions thus obtained, it is most preferred that the polymerization is carried out in a loop reactor/a gas-phase reactor combination.

According to a preferred embodiment of the invention, the process comprises a slurry-phase polymerization stage and a gas-phase polymerization stage. One suitable reactor configuration comprises one to two slurry reactors, preferably loop reactors, and one gas-phase reactor. Such polymerization configuration is described e.g. in patent literature, such as in WO92/12182 A1, WO96/18662 A1 and WO2010054732 of Borealis and known as Borstar technology.

The catalyst may be transferred into the polymerization zone by any means known in the art. It is thus possible to suspend the catalyst in a diluent and maintain it as homogeneous slurry. Especially preferred it is to use oil having a viscosity from 20 to 1500 mPa*s as diluent, as disclosed in WO2006/063771 A1. It is also possible to mix the catalyst with a viscous mixture of grease and oil and feed the resultant paste into the polymerization zone. Further still, it is possible to let the catalyst settle and introduce portions of thus obtained catalyst mud into the polymerization zone in a manner disclosed, for instance, in EP 428 054 A1.

The polymerization in slurry usually takes place in an inert diluent, typically a hydrocarbon diluent such as methane, ethane, propane, n-butane, isobutane, pentanes, hexanes, heptanes, octanes etc., or their mixtures. Preferably, the diluent is a low-boiling hydrocarbon having from 1 to 4 carbon atoms or a mixture of such hydrocarbons. An especially preferred diluent is propane, possibly containing minor amount of methane, ethane and/or butane.

The temperature in the slurry polymerization is typically from 40 to 115° C., preferably from 60 to 110° C. and in particular from 70 to 100° C. The pressure is from 1 to 150 bar, preferably from 10 to 100 bar.

The slurry polymerization may be conducted in any known reactor used for slurry polymerization. Such reactors include a continuous stirred tank reactor and a loop reactor. It is especially preferred to conduct the polymerization in loop reactor. Hydrogen is fed, optionally, into the reactor to control the molecular weight of the polymer as known in the art.

Furthermore, one or more α-olefin comonomers may be added into the reactor to control the density and morphology of the polymer product. The actual amount of such hydrogen and comonomer feeds depends on the desired melt index (or molecular weight) and density (or comonomer content) of the resulting polymer.

The polymerization in gas-phase may be conducted in a fluidized bed reactor, in a fast-fluidized bed reactor or in a settled bed reactor or in any combination of these.

Typically, the fluidized bed or settled bed polymerization reactor is operated at a temperature within the range of from 50 to 100° C., preferably from 65 to 90° C. The pressure is suitably from 10 to 40 bar, preferably from 15 to 30 bar.

In addition, antistatic agent(s) may be introduced into the slurry and/or gas-phase reactor if needed.

The process may further comprise pre- and post-reactors.

The polymerization steps may be preceded by a pre-polymerization step. The pre-polymerization step may be conducted in slurry or in gas phase. Preferably, pre-polymerization is conducted in slurry, and especially in a loop reactor. The temperature in the pre-polymerization step is typically from 0 to 90° C., preferably from 20 to 80° C. and more preferably from 30 to 70° C.

The pressure is not critical and is typically from 1 to 150 bar, preferably from 10 to 100 bar.

The polymerization may be carried out continuously or batch wise, preferably the polymerization is carried out continuously.

In a first example of the present process, polymerizing olefins is accomplished in a multi-stage polymerization process comprising at least one gas-phase reactor for producing ethylene (co) polymers.

In a second example of the present process, polymerizing ethylene with comonomers as herein discussed is accomplished in a multi-stage polymerization process comprising at least one slurry reactor, such as one or two slurry reactors, preferably two slurry reactors, and one gas-phase reactor.

A chain-transfer agent, preferably hydrogen, is added as required to the reactors, and preferably 100 to 500 moles of $H_2$ per one kmol of ethylene are added to the reactor, when the LMW fraction is produced in this reactor, and 0 to 70 moles of $H_2$ per one kmol of ethylene are added to the gas phase reactor when this reactor is producing the HMW fraction.

The polymerization is conducted in the presence of an olefin polymerization catalyst. The catalyst preferably is a Ziegler-Natta (ZN) catalyst which generally comprises at least a catalyst component formed from a transition metal compound of Group 4 to 6 of the Periodic Table (IUPAC, Nomenclature of Inorganic Chemistry, 1989), a metal compound of Group 1 to 3 of the Periodic Table (IUPAC), optionally a compound of group 13 of the Periodic Table (IUPAC), and optionally an internal organic compound, like an internal electron donor. A ZN catalyst may also comprise further catalyst component(s), such as a cocatalyst and optionally external additives.

Suitable ZN catalysts preferably contain a magnesium compound, an aluminium compound and a titanium compound supported on a particulate support.

The particulate support can be an inorganic oxide support, such as silica, alumina, titania, silica-alumina, silica-titania or a $MgCl_2$ based support. Preferably, the support is silica or a $MgCl_2$ based support.

Particularly preferred Ziegler-Natta catalysts are such as described in EP 1 378 528 A1.

If used, the magnesium compound preferably is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is a chlorine containing aluminium alkyl. Especially preferred compounds are aluminium alkyl dichlorides and aluminium alkyl sesquichlorides.

The transition metal compound of Group 4 to 6 is preferably a titanium or vanadium compound, more preferably a halogen containing titanium compound, most preferably chlorine containing titanium compound. Especially preferred titanium compound is titanium tetrachloride.

The catalyst can be prepared by sequentially contacting the carrier with the above mentioned compounds, as described in EP 688794 or WO 99/51646. Alternatively, it can be prepared by first preparing a solution from the components and then contacting the solution with a carrier, as described in WO 01/55230.

Another group of suitable ZN catalysts contain a titanium compound together with a magnesium halide compound acting as a support. Thus, the catalyst contains a titanium compound and optionally a Group 13 compound, for example an aluminium compound on a magnesium dihalide, like magnesium dichloride. Such catalysts are disclosed, for instance, in WO 2005/118655, EP 810235, WO2014/096296 and WO2016/097193.

Suitable activators are group 13 metal compounds, typically group 13 alkyl compounds and especially aluminium alkyl compounds, where the alkyl group contains 1 to 16 C-atoms. These compounds include trialkyl aluminium compounds, such as tri-trimethylaluminium, triethylaluminium, isobutylaluminium, trihexylaluminium and tri-n-octylaluminium, alkyl aluminium halides, such as ethylalu-minium dichloride, diethylaluminium chloride, ethylaluminium sesquichloride, dimethylaluminium chloride and the like. Especially preferred activators are trial-kylaluminiums, of which triethylaluminium, trimethylalu-minium and tri-isobutylaluminium are particularly used.

The amount in which the activator is used depends on the specific catalyst and activator. Typically triethylaluminium is used in such amount that the molar ratio of aluminium to the transition metal, like Al/Ti, is from 1 to 1,000, preferably from 3 to 100 and in particular from about 5 to about 30 mol/mol.

An optional internal organic compound may be chosen from the following classes: ethers, esters, amines, ketones, alcohols, anhydrides or nitriles or mixtures thereof. Prefer-ably, the optional internal organic compound is selected from ethers and esters, most preferably from ethers. Pre-ferred ethers are of 2 to 20 carbon-atoms and especially mono, di or multi cyclic saturated or unsaturated ethers comprising 3 to 6 ring atoms. Typical cyclic ethers suitable in the present invention, if used, are tetrahydrofuran (THF), substituted THF, like 2-methyl THF, di-cyclic ethers, like 2,2-di(2-tetrahydrofuryl) propane, or isomers or mixtures thereof. Internal organic compounds are also often called as internal electron donors.

The composition of the invention preferably is produced in a process comprising a compounding step, wherein the composition, i.e. the blend, which is typically obtained as a polyolefin base resin powder from the reactor, is extruded in an extruder and then pelletised to polymer pellets in a manner known in the art. The extruder may be e.g. any conventionally used extruder. As an example of an extruder for the present compounding step may be those supplied by Japan Steel works, Kobe Steel or Farrel-Pomini, e.g. JSW 460P or JSW CIM90P.

In certain embodiments, the extrusion step is carried out using feed rates of 100 kg/h to 500 kg/h, more preferably 150 kg/h to 300 kg/h.

The screw speed of the extruder may be 200 rpm to 500 rpm, more preferably 300 rpm to 450 rpm.

In certain embodiments, in said extrusion step the SEI (specific energy input) of the extruder may be 100 kWh/ton to 400 kWh/ton, more preferably 150 kWh/ton to 300 kWh/ton.

The melt temperature in said extrusion step is preferably 200° C. to 300° C., more preferably 230° C. to 270° C.

The present invention furthermore relates to an article, preferably a pipe or a pipe fitting, comprising, or consisting of, the polyethylene composition in any one of the embodi-ments as herein described.

The invention also relates to the use of a polyethylene composition in any one of the embodiments as herein described for producing an article, preferably a pipe or a pipe fitting.

Unless explicitly described otherwise, the description of the present invention is to be understood so that one or more of any of the above described preferred embodiments of the invention can be combined with the invention described in its most general features.

For sake of completeness it should be remarked that while certain properties (such as short term pressure resistance or the point loading resistance) are tested on specific test pipe specimens (such as pipes of a specific thickness and diam-eter), they are nevertheless properties of the polymer com-position used for making the test pipe specimen.

In the following, the measurement and determination methods for the parameters as used herein are given and the present invention is further illustrated by way of example and comparative example by reference to the figures, which show:
Measurement and Determination Methods
a) Measurement of Melt Flow Rate MFR The melt flow rate (MFR) is determined according to ISO 1133 and is indicated in g/10 min. The higher the melt flow rate, the lower the viscosity of the polymer. The MFR is determined at 190° C. for polyethylene and at a loading of 2.16 kg ($MFR_2$), 5.00 kg ($MFR_5$) or 21.6 kg ($MFR_{21}$).

The quantity FRR (flow rate ratio) is an indication of molecular weight distribution and denotes the ratio of flow rates at different loadings. Thus, $FRR_{21/5}$ denotes the value of $MFR_{21}/MFR_5$.

b) Quantification of Microstructure by NMR Spectroscopy

Quantitative nuclear-magnetic resonance (NMR) spec-troscopy was used to quantify the comonomer content of the polymers.

Quantitative $^{13}C$ $\{^1H\}$ NMR spectra recorded in the molten-state using a Bruker Avance III 500 NMR spectrom-eter operating at 500.13 and 125.76 MHz for $^1H$ and $^{13}C$ respectively. All spectra were recorded using a $^{13}C$ opti-mised 7 mm magic-angle spinning (MAS) probehead at 150° C. using nitrogen gas for all pneumatics. Approxi-mately 200 mg of material was packed into a 7 mm outer diameter zirconia MAS rotor and spun at 4 kHz. This setup was chosen primarily for the high sensitivity needed for rapid identification and accurate quantification (Klimke, K., Parkinson, M., Piel, C., Kaminsky, W., Spiess, H. W., Wilhelm, M., Macromol. Chem. Phys. 2006; 207:382., Par-kinson, M., Klimke, K., Spiess, H. W., Wilhelm, M., Mac-romol. Chem. Phys. 2007; 208:2128., Castignolles, P., Graf, R., Parkinson, M., Wilhelm, M., Gaborieau, M., Polymer 50 (2009) 2373). Standard single-pulse excitation was employed utilising the transient NOE at short recycle delays of 3s (Pollard, M., Klimke, K., Graf, R., Spiess, H. W., Wilhelm, M., Sperber, O., Piel, C., Kaminsky, W., Macro-molecules 2004; 37:813., Klimke, K., Parkinson, M., Piel, C., Kaminsky, W., Spiess, H. W., Wilhelm, M., Macromol. Chem. Phys. 2006; 207:382.) and the RS-HEPT decoupling scheme (Filip, X., Tripon, C., Filip, C., J. Mag. Resn. 2005, 176, 239, Griffin, J. M., Tripon, C., Samoson, A., Filip, C., and Brown, S. P., Mag. Res. in Chem. 2007 45, S1, S198). A total of 16348 (16k) transients were acquired per spec-trum. This setup was chosen due its high sensitivity towards sometimes low comonomer contents.

Quantitative $^{13}C$ $\{^1H\}$ NMR spectra were processed, integrated and quantitative properties determined using cus-tom spectral analysis automation programs. All chemical shifts are internally referenced to the bulk methylene signal (δ+) at 30.00 ppm (J. Randall, Macromol. Sci., Rev. Mac-romol. Chem. Phys. 1989, C29, 201).

Characteristic signals corresponding to the incorporation of 1-hexene were observed (J. Randall, Macromol. Sci., Rev. Macromol. Chem. Phys. 1989, C29, 201.) and all contents calculated with respect to all other monomers present in the polymer.

Characteristic signals resulting from isolated 1-hexene incorporation i.e. EEHEE comonomer sequences, were observed. Isolated 1-hexene incorporation was quantified using the integral of the signal at 38.2 ppm assigned to the *B4 sites, accounting for the number of reporting sites per comonomer:

$$H = I_{*B4}$$

When characteristic signals resulting from consecutive 1-hexene incorporation, i.e. EHHE comonomer sequences were observed, such consecutive 1-hexene incorporation was quantified using the integral of the signal at 40.4 ppm assigned to the $\alpha\alpha B4B4$ sites accounting for the number of reporting sites per comonomer:

$$HH=2*I_{\alpha\alpha B4B4}$$

When characteristic signals resulting from non consecutive 1-hexene incorporation, i.e. EHEHE comonomer sequences were observed, such non-consecutive 1-hexene incorporation was quantified using the integral of the signal at 24.6 ppm assigned to the BBB4B4 sites accounting for the number of reporting sites per comonomer:

$$HEH=2*I_{\beta\beta B4B4}$$

Due to the overlap of the signals from the *B4 and *$\beta$B4B4 sites from isolated (EEHEE) and non-consecutively incorporated (EHEHE) 1-hexene respectively the total amount of isolated 1-hexene incorporation is corrected based on the amount of non-consecutive 1-hexene present:

$$H=I_{*B4}-2*I_{\beta\beta B4B4}$$

With no other signals indicative of other comonomer sequences, i.e. 1-hexene chain initiation, observed the total 1-hexene comonomer content was calculated based solely on the amount of isolated (EEHEE), consecutive (EHHE) and non-consecutive (EHEHE) 1-hexene comonomer containing sequences:

$$H_{total}=H+HH+HEH$$

Characteristic signals resulting from saturated end-groups were observed. The content of such saturated end-groups was quantified using the average of the integral of the signals at 22.8 and 32.2 ppm assigned to the 2s and 3s sites respectively:

$$S=(1/2)*(I_{2S}+I_{3S})$$

The relative content of ethylene was quantified using the integral of the bulk methylene ($\delta+$) signals at 30.00 ppm:

$$E=(1/2)*I_{\delta+}$$

The total ethylene content was calculated based the bulk methylene signals and accounting for ethylene units present in other observed comonomer sequences or end-groups:

$$E_{total}=E+(2/2)*H+(1/4)*HH+(3/4)*HEH+(3/2)*S$$

The total mole fraction of 1-hexene in the polymer was then calculated as:

$$fH=H_{total}/(E_{total}+H_{total})$$

The total comonomer incorporation of 1-hexene in mole percent was calculated from the mole fraction in the usual manner:

$$H\ [mol\ \%]=100*fH$$

The total comonomer incorporation of 1-hexene in weight percent was calculated from the mole fraction in the standard manner:

$$H\ [wt\ \%]=100*(fH*84.16)/((fH*84.16)+((1-fH)*28.05))$$

The comonomer incorporation of 1-hexene in mole percent in high Mw fraction was calculated from the total comonomer incorporation in the usual manner:

$$H\ in\ HMW\ [mol\ \%]=100\%*H\ [mol\ \%]/Split\ of\ HMW\ fraction\ \%$$

Note, that amount of HDPE or LDPE color master batch carrier resin is not taken into account.

c) Molecular Weight Properties

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4: 2003 and ASTM D 6474-99 using the following formulas:

$$M_n = \frac{\sum_{i=1}^{N} A_i}{\sum (A_i/M_i)}$$

$$M_w = \frac{\sum_{i=1}^{N} (A_i \times M_i)}{\sum A_i}$$

$$M_z = \frac{\sum_{i=1}^{N} (A_i \times M_i^2)}{\sum (A_i/M_i)}$$

For a constant elution interval $\Delta V_i$, where $A_i$ and $M_i$ are the chromatographic peak slice area and polyolefin molecular weight (MW).

A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/l 2,6-Di-tert-butyl-4-methyl-phenol) as solvent at 160° C. and at a constant flow rate of 1 ml/min. 200 μL of sample solution were injected per analysis. The column set was calibrated using universal calibration (according to ISO 16014-2:2003) with at least 15 narrow MWD polystyrene (PS) standards in the range of 0.5 kg/mol to 11500 kg/mol. Mark Houwink constants used for PS, PE and PP are as described per ASTM D 6474-99. All samples were prepared by dissolving 5.0 to 9.0 mg of polymer in 8 ml (at 160° C.) of stabilized TCB (same as mobile phase) for 2.5 hours for PP or 3 hours for PE at 160° C. under continuous gentle shaking in the autosampler of the GPC instrument.

d) Density

Density of the polymer was measured according to ISO 1183-1:2004 (method A) on compression moulded specimen prepared according to EN ISO 1872-2 (February 2007) and is given in kg/m³.

e) Charpy Impact Strength (CIS)

Charpy impact strength was determined according to ISO179/1eA:2000 on V-notched samples of 80*10*4 mm³ at 23° C. (Charpy impact strength (23° C.)), at 0° C. (Charpy impact strength (0° C.)) and −20° C. (Charpy impact strength (−20° C.)). Samples were milled from plaques of 4 mm thickness prepared by compression molding according to ISO 293:2004 using the conditions defined in chapter 3.3 of ISO 1872-2:2007.

f) Strain Hardening Modulus

Strain hardening modulus of the compounds was obtained from a tensile stress-strain curve above the natural draw ratio and represents the slope of the increase in the stress-strain trend at very high strains (the strain hardening regime). It was measured at 80° C. and 20 mm/min on preconditioned (120° C./1 h) 300 μm thick specimens according to ISO 18488.

g) Eta$_{747}$

One method which correlates well with the sagging properties, and is used in connection with the present invention relates to the rheology of the polymer and is based on determination of the viscosity of the polymer at a very low, constant shear stress. A shear stress of 747 Pa has been selected for this method. The viscosity of the polymer at this shear stress is determined at a temperature of 190° C. and has been found to be inversely proportional to the gravity flow of the polymer, i.e. the greater the viscosity the lower the gravity flow.

The determination of the viscosity at 747 Pa shear stress is made by using a rotational rheometer, which can be a constant stress rheometer as for example an Anton Paar MCR Series Rheometer. Rheometers and their function have been described in "Encyclopedia of Polymer Science and Engineering", 2nd Ed., Vol. 14, pp. 492-509. The measurements are performed under a constant shear stress between two 25 mm diameter plates (constant rotation direction). The gap between the plates is 1.2 mm. A 1.2 mm thick polymer sample is inserted between the plates.

The sample is temperature conditioned during 2 min before the measurement is started. The measurement is performed at 190° C. After temperature conditioning the measurement starts by applying the predetermined stress. The stress is maintained during 1800 s to let the system approach steady state conditions. After this time the measurement starts and the viscosity is calculated.

The measurement principle is to apply a certain torque to the plate axis via a precision motor. This torque is then translated into a shear stress in the sample. This shear stress is kept constant. The rotational speed produced by the shear stress is recorded and used for the calculation of the viscosity of the sample.

h) Short Term Pressure Resistance

The pressure test on un-notched 32 mm SDR 11 pipes having a length of 450 mm is carried out in water-inside and water-outside environment according to ISO 1167-1:2006. End caps type A were used. The time to failure is determined in hours. A hoop stress of 12.0 MPa and a temperature of 20° C. was applied.

i) Rapid Crack Propagation Resistance

The rapid crack propagation (RCP) resistance of a pipe may be determined according to a method called the S4 test (Small Scale Steady State), which has been developed at Imperial College, London, and which is described in ISO 13477:2008. The outer diameter of the pipe is about 110 mm or greater and its wall thickness about 10 mm or greater. When determining the RCP properties of a pipe in connection with the present invention, the outer diameter and the wall thickness have been selected to be 110 mm and 10 mm, respectively. The length of the pipe is 785 mm. While the exterior of the pipe is at ambient pressure (atmospheric pressure), the pipe is pressurized internally, and the internal pressure in the pipe is kept constant at a pressure of 4.0 bar positive pressure. The length of the gauge is 590 mm. The pipe and the equipment surrounding it are conditioned to a predetermined temperature. A number of discs have been mounted on a shaft inside the pipe to prevent decompression during the tests. A knife projectile is shot, with well-defined forms, and a mass of 1500 g towards the pipe close to its one end in the so-called initiating zone in order to start a rapidly running axial crack. The speed of the knife is 16+/−1 m/s. The initiating zone is provided with an abutment for avoiding unnecessary deformation of the pipe. The test equipment is adjusted in such a manner that crack initiation takes place in the material involved, and a number of tests are effected at varying temperatures. The axial crack length in the measuring zone, having a total length of 4.7 diameters, is measured for each test and is plotted against the set test temperature. If the crack length exceeds 4.7 diameters, the crack is assessed to propagate. If the pipe passes the test at a given temperature, the temperature is lowered successively until a temperature is reached, at which the pipe no longer passes the test where the crack propagation exceeds 4.7 times the pipe diameter.

The critical temperature $(T_{crit})$ i.e. the ductile brittle transition temperature as measured according to ISO 13477:2008 is the lowest temperature at which the pipe passes the test. The lower the critical temperature the better, since it results in an extension of the applicability of the pipe.

j) Accelerated Point Loading Test (PLT+)

The accelerated point loading test (PLT+) is carried in accordance with PAS 1075 and simulates an installation situation in which the pipe is disturbed by the external influence of a point load, such as stones or sharp-cornered objects.

The test procedure is similar to the internal pressure creep test, with the difference being that an external point load (generally a punch) is also applied before the internal pressure. To accelerate the test further, a wetting agent solution is applied to the test sample.

The accelerated point load test (PLT+) was performed by Hessel Ingenieurtechnik GmbH, Roetgen, Germany.

The ends of a 32 mm or 110 mm outer diameter SDR 11 pipes were closed by using end-caps. One of the end caps was equipped with a pressure connection.

The required surface elongation at the inner pipe wall (i.e. the above yield elongation) was produced by a tool displacement from the outer surface along the radius of the pipe with a tool tip radius of 5 mm.

The internal pressure of the pipe was selected according to a circumferential stress of 4 $N/mm^2$. The test temperature was 90° C. In order to shorten the testing times the investigations were performed using an 2% aqueous 'Netzmittel 5' (tenside used by Hessel Ingenieurtechnik) in demineralised water which was continuously mixed inside the pipe. The point loading tests have been performed on a single specimen.

k) Accelerated Creep Test (ACT)

Long-term stability as defined herein as accelerated full notch creep test (FNCT) in particular refers to a resistance against crack growth, which is determined in accordance with the test method FNCTNM5. The results as reported herein concerning FNCTNM5 are results obtained according to ISO16770 as carried out by Hessel Ingenieurtechnik GmbH, Roetgen, Germany.

The materials for testing are made into plaques in following compression moulding conditions:

Heating ramp 15° C./min, 10 min from 30° C. to 180° C., no pressure 25 bars pressure at 180° C., 35 min 144 bars pressure at 180° C., 25 min Slow Cooling ramp 2° C./min, From 180° C. to 30° C., Pressure 144 bars, 75 min Last part, 30° C., 2 min before press opens Plaques are round shaped and have diameter of 150 mm and thickness of 10 mm.

The tests are performed on notched specimens, which are machined from the plaques with parallel sides and square cross-sections (10 mm×10 mm). Each specimen was notched perpendicular to the parallel length in the middle of the test specimen. The notched specimens are tested at 90° C. and 4 MPa in 2% aqueous 'Netzmittel 5' (tenside used by Hessel Ingenieurtechnik). 3 specimens were tested for each material and the geometric mean value is reported.

I) Pressure Test on Notched Pipes (NPT)

The slow crack propagation resistance is determined according to ISO 13479-2009 in terms of the number of hours the pipe withstands a certain pressure at a certain temperature before failure. The pressure test is carried out on notched SDR11 pipes having an outer diameter of 110 mm. A pressure of 9.2 bars and a temperature of 80° C. have been used. Notching is made with a climb milling cutter with a 60° included-angle V-cutter conforming to ISO 6108, having a cutting rate of 0.010±0.002 (mm/rev)/tooth. The used cutter has 24 teeth and the speed of the cutter is 680 rpm. The remaining ligament is 0.82-0.78 times the minimum wall thickness. The depth of the notch is calculated using equation below. h is the notch depth in mm. The four notches are equally placed in the pipe circumference.

The length of the notch is 110±1 mm.

$$h = 0.5\left[d_{em} - \sqrt{(d_{em}^2 - b_s^2)}\right] + 0.866b_s$$

where $b_s$: is the width of machined surface of the notch, in millimeters;

$d_{em}$: is the measured mean pipe outside diameter, in millimeters.

Examples

1) Polyethylene Compositions and Pipes Comprising Carbon Black

Polyethylene base resins and compositions according to the invention (IE1 to IE8) and for comparison (CE1 to CE4) were produced using a Ziegler-Natta catalyst which was prepared according to Example 1 of EP 1 378 528 A1 (catalyst A).

IE1:

A loop reactor having a volume of 50 dm³ was operated at a temperature of 70° C. and a pressure of 57 bar. Into the reactor were fed ethylene, propane diluent and hydrogen. Also a solid polymerization catalyst component produced as described above was introduced into the reactor together with triethylaluminium cocatalyst so that the molar ratio of Al/Ti was about 15. The estimated production split was 2 wt. %.

A stream of slurry was continuously withdrawn and directed to a loop reactor having a volume of 150 dm³ and which was operated at a temperature of 95° C. and a pressure of 55 bar. Into the reactor were further fed additional ethylene, propane diluent and hydrogen so that the ethylene concentration in the fluid mixture was 3.4% by mole and the hydrogen to ethylene ratio was 415 mol/kmol. The estimated production split was 16 wt. %. The ethylene homopolymer withdrawn from the reactor had MFR₂ of 657 g/10 min.

A stream of slurry from the reactor was withdrawn intermittently and directed into a loop reactor having a volume of 350 dm³ and which was operated at 95° C. temperature and 54 bar pressure. Into the reactor was further added a fresh propane, ethylene, and hydrogen so that the ethylene concentration in the fluid mixture was 3.3 mol-% and the molar ratio of hydrogen to ethylene was 345 mol/kmol. The ethylene homopolymer withdrawn from the reactor had MFR₂ of 350 g/10 min. The estimated production split was 27 wt. %.

The slurry was withdrawn from the loop reactor intermittently and directed to a flash vessel operated at a temperature of 50° C. and a pressure of 3 bar. From there the polymer was directed to a fluidized bed gas phase reactor operated at a pressure of 20 bar and a temperature of 80° C. Additional ethylene and 1-hexene comonomer, nitrogen as inert gas and hydrogen were added so that the molar ratio of hydrogen to ethylene was 7 mol/kmol and the molar ratio of 1-hexene to ethylene was 59 mol/kmol. The estimated production split was 55 wt. %. The polymer had a melt flow rate MFR₅ of 0.20 g/10 min and a density of 946.0 kg/m³.

IE2 to IE8 and CE1 to CE4:

The procedure of IE1 was repeated by changing reactor conditions as described in Table 1.

Polymerization conditions and properties of the produced base resins and polyethylene compositions of the inventive and comparative examples are shown in Tables 1 and 2, respectively.

The polymer powder of each of the samples IE1 to IE 8 and CE1 to CE4 was mixed under nitrogen atmosphere with 5.5% of carbon black master-batch (CB content 40%), 2500 ppm of antioxidants and 400 ppm Ca-stearate. Then it was compounded and extruded under nitrogen atmosphere to pellets by using a JSW CIMP80 twin screw extruder so that the SEI was about 180 kWh/ton and the melt temperature 250° C. to obtain the polyethylene compositions.

Comparative Examples CE5 and CE6 are commercially available black polyethylene compositions Eltex TUB 121N6000 and Eltex TUB 121N9000, respectively.

TABLE 1

| Example | IE1 | IE2 | IE3 | IE4 | IE5 | IE6 | IE7 | IE8 | CE1 | CE2 | CE3 | CE4 |
|---|---|---|---|---|---|---|---|---|---|---|---|---|
| Catalyst | A | A | A | A | A | A | A | A | A | A | A | A |
| Prepoly. reactor | | | | | | | | | | | | |
| Temp. (° C.) | 70 | 70 | 70 | 70 | 70 | 70 | 70 | 70 | 70 | 70 | 70 | 70 |
| Press. (kPa) | 5771 | 5765 | 5752 | 5760 | 5770 | 5715 | 5755 | 5760 | 5590 | 5602 | 5593 | 5604 |
| Split (wt. %) | 2 | 2 | 2 | 2 | 2 | 2 | 2 | 2 | 2 | 2 | 2 | 2 |
| First loop reactor | | | | | | | | | | | | |
| Temp. (° C.) | 95 | 95 | 95 | 95 | 95 | 95 | 95 | 95 | 95 | 95 | 95 | 95 |
| Press. (kPa) | 5536 | 5533 | 5542 | 5535 | 5540 | 5535 | 5530 | 5540 | 5424 | 5400 | 5412 | 5406 |
| C2 conc. (mol %) | 3.4 | 3.7 | 4.6 | 4.1 | 4.0 | 3.9 | 3.9 | 3.9 | 5.3 | 5.0 | 6.3 | 5.5 |
| H2/C2 ratio (mol/kmol) | 415 | 376 | 394 | 405 | 390 | 380 | 380 | 385 | 331 | 362 | 330 | 373 |
| Split (wt. %) | 16 | 16 | 16 | 16 | 16 | 16 | 16 | 16 | 13 | 11 | 11 | 12 |
| MFR2 (g/10 min) | 657 | 168 | 128 | 310 | 280 | 260 | 260 | 260 | 160 | 192 | 208 | 284 |
| Second loop reactor | | | | | | | | | | | | |
| Temp. (° C.) | 95 | 95 | 95 | 95 | 95 | 95 | 95 | 95 | 95 | 95 | 95 | 95 |
| Press. (kPa) | 5393 | 5392 | 5392 | 5390 | 5390 | 5394 | 5391 | 5391 | 5390 | 5391 | 5389 | 5390 |
| C2 conc. (mol %) | 3.3 | 3.7 | 3.6 | 3.6 | 3.7 | 3.7 | 3.6 | 3.6 | 4.0 | 3.8 | 4.0 | 3.9 |
| H2/C2 ratio (mol/kmol) | 345 | 322 | 392 | 395 | 375 | 370 | 365 | 365 | 366 | 368 | 371 | 374 |
| Split (wt. %) | 27 | 26 | 27 | 27 | 27 | 27 | 27 | 27 | 28 | 29 | 26 | 26 |
| MFR2 (g/10 min) | 350 | 256 | 272 | 400 | 300 | 290 | 280 | 280 | 380 | 280 | 360 | 331 |

TABLE 1-continued

| Example | IE1 | IE2 | IE3 | IE4 | IE5 | IE6 | IE7 | IE8 | CE1 | CE2 | CE3 | CE4 |
|---|---|---|---|---|---|---|---|---|---|---|---|---|
| Gas phase reactor | | | | | | | | | | | | |
| Temp. (° C.) | 80 | 80 | 80 | 80 | 80 | 80 | 80 | 80 | 85 | 85 | 85 | 85 |
| Press. (kPa) | 2002 | 2000 | 2000 | 2000 | 2002 | 2002 | 2000 | 2000 | 2000 | 2000 | 2000 | 2000 |
| H2/C2 ratio (mol/kmol) | 7 | 7 | 7 | 8 | 7 | 6 | 5 | 5 | 13 | 16 | 3 | 21 |
| C6/C2 ratio (mol/kmol) | 59 | 57 | 53 | 61 | 59 | 62 | 61 | 60 | 35 | 35 | 59 | 59 |
| Split (wt. %) | 55 | 56 | 55 | 55 | 55 | 55 | 55 | 55 | 57 | 58 | 61 | 60 |

TABLE 2

| Example | IE1 | IE2 | IE3 | IE4 | IE5 | IE6 | IE7 |
|---|---|---|---|---|---|---|---|
| Base resin properties | | | | | | | |
| Density [kg/m$^3$] | 946.0 | 946.0 | 946.6 | 945.0 | 946.0 | 945.0 | 945.0 |
| Polyethylene composition properties | | | | | | | |
| MFR$_5$ [g/10 min] | 0.21 | 0.21 | 0.21 | 0.29 | 0.26 | 0.22 | 0.21 |
| MFR$_{21}$ [g/10 min] | 6.16 | 6.06 | 6.73 | 8.95 | 8.39 | 7.49 | 7.52 |
| FRR$_{21/5}$ | 29.3 | 28.9 | 32.0 | 30.9 | 32.3 | 34.0 | 35.8 |
| Mn [kg/mol] | 10.4 | 10.2 | 9.97 | 9.06 | 9.35 | 9.78 | 9.74 |
| Mw [kg/mol] | 260 | 264 | 260 | 240.5 | 246.5 | 274.0 | 265.5 |
| Mz [kg/mol] | 1,290 | 1,290 | 1,310 | 1,325 | 1,360 | 1,575 | 1,520 |
| Mw/Mn | 25.0 | 25.9 | 26.1 | 26.6 | 26.4 | 28.0 | 27.3 |
| C6 total [mol %] | 0.64 | 0.64 | 0.60 | 0.65 | 0.66 | 0.64 | 0.62 |
| C6 in HMW fraction [mol %] | 1.16 | 1.17 | 1.09 | 1.18 | 1.20 | 1.16 | 1.13 |
| Eta$_{747}$ [kPa*s] | 401.1 | 424.3 | 465.9 | 405.4 | 453.7 | 698.2 | 684.4 |
| SH modulus [MPa] | 91.3 | 94.1 | 94.1 | 90.4 | 96.0 | 99.2 | 98.7 |
| Density [kg/m$^3$] | 956.9 | 956.5 | 958.0 | 957.9 | 957.3 | 957.0 | 957.2 |
| SPTR (12.0 MPa/20° C.) [h] | 282 | 273 | 373 | 345 | 253 | 204 | 241 |
| Tc [° C.] | −18.5 | −18.6 | −18.6 | −12.9 | −12.0 | −15.7 | −17.3 |
| CIS (23° C.) [kJ/m$^2$] | 49.2 | 50.5 | 45.5 | 35.4 | 37.1 | 41.9 | 42.1 |
| CIS (0° C.) [kJ/m$^2$] | 36.0 | 36.4 | 33.7 | | | | |
| CIS (−20° C.) [kJ/m$^2$] | 22.1 | 22.9 | 22.2 | 14.8 | 15.6 | 18.7 | 18.6 |
| PLT+, 32 mm pipes [h] | | | | 2350 | 2227 | 3432 | 4578 |
| PLT+, 110 mm pipes [h] | | | | 3363 | 4330 | | 3652 |
| ACT [h] | | | | 3646 | 3712 | 4347 | 4661 |

| Example | IE8 | CE1 | CE2 | CE3 | CE4 | CE5 | CE6 |
|---|---|---|---|---|---|---|---|
| Base resin properties | | | | | | | |
| Density [kg/m$^3$] | 946.0 | 948.9 | 948.4 | 942.5 | 945.5 | NA | NA |
| Polyethylene composition properties | | | | | | | |
| MFR$_5$ [g/10 min] | 0.23 | 0.31 | 0.31 | 0.21 | 0.62 | 0.28 | 0.22 |
| MFR$_{21}$ [g/10 min] | 7.93 | 8.04 | 7.74 | 6.18 | 12.88 | 7.9 | 7.5 |
| FRR$_{21/5}$ | 34.5 | 25.9 | 25.0 | 29.4 | 20.8 | 28.2 | 34.1 |
| Mn [kg/mol] | 9.69 | 9.5 | 9.42 | 9.72 | 9.81 | 7.98 | 9.23 |
| Mw [kg/mol] | 265.5 | 230.5 | 228.5 | 257.5 | 192.5 | 217.5 | 240 |
| Mz [kg/mol] | 1,525 | 1,150 | 1,100 | 1,295 | 909.5 | 1,070 | 1,245 |
| Mw/Mn | 27.4 | 24.3 | 24.3 | 26.5 | 19.6 | 27.3 | 26.0 |
| C6 total [mol %] | 0.58 | 0.48 | 0.44 | 0.88 | 0.76 | 0.46 | 0.46 |
| C6 in HMW fraction [mol %] | 1.05 | 0.83 | 0.77 | 1.47 | 1.26 | | |
| Eta$_{747}$ [kPa*s] | 590.2 | 253.2 | 248.3 | 426.3 | 101.9 | 265.6 | 828.1 |
| SH modulus [MPa] | 94 | 64.7 | 65.3 | 111 | 65.1 | 81.9 | 87.3 |
| Density [kg/m$^3$] | 957.8 | 959.0 | 960.6 | 955.6 | 955.7 | 960.0 | 959.4 |
| SPTR (12.0 MPa/20° C.) [h] | 241 | 614 | 431 | 87 | 79 | | |
| Tc [° C.] | −13.6 | −13.6 | −13.7 | −18.5 | −6.4 | −4.1 | |
| CIS (23° C.) [kJ/m$^2$] | 37.6 | 30.4 | 30.8 | 55.7 | 32.2 | 28.2 | 35.8 |
| CIS (0° C.) [kJ/m$^2$] | | 22.5 | 22.1 | 41.5 | 21.7 | 17.6 | 22.4 |
| CIS (−20° C.) [kJ/m$^2$] | 16.8 | 11.3 | 14.3 | 24.6 | 10.0 | 9.4 | 14.6 |
| PLT+, 32 mm pipes [h] | 1936 | | | | | | |
| PLT+, 110 mm pipes [h] | | | | | | | |
| ACT [h] | 3234 | | | | | | |

IE1 to IE8 demonstrate the combination of excellent slow crack growth resistance (as demonstrated by the strain hardening modulus) together with very good impact resistance and good rapid crack propagation resistance (low critical temperature), while also meeting the requirements of PE100 standard. Furthermore, the compositions of IE4 to IE8 also show excellent behaviour in the accelerated point loading test and in the ACT test.

This advantageous combination of properties is achieved by the relatively high Mn of the composition, the specific amount of hexene-1 in the high molecular weight fraction, the specific amount (weight fraction) of the high molecular weight fraction, the MFR in the defined range and the specific comonomer used (hexene-1).

Comparative Examples 1 to 6 demonstrate that deviation from the proposed polymer structure yield inferior combination of the aforementioned polymer properties. CE1 and CE2 contain 0.83 and 0.77 mol %, respectively, of hexene-1 in the high Mw fraction, resulting in the immediate reduction of the strain hardening modulus (used as the measure of slow crack growth resistance). On the other side, CE3 contains 1.47 mol % of hexene-1 in the high Mw fraction, i.e. more comonomer than the inventive examples. This results in higher strain hardening modulus but this material fails to meet the requirement of PE100 standard, which is, i.a., to withstand 100 hours in the short term pressure resistance testing at 12.0 MPa and 20° C.

CE4 has 1.26 mol % of hexene-1 in the high Mw fraction, i.e. more comonomer in the high Mw fraction than the comparative examples, but at the same time it has lower strain hardening modulus due to a higher melt flow rate, and also the critical temperature Tc, indicating the rapid crack propagation resistance behaviour, is inferior.

Comparative examples Eltex TUB 121N6000 and Eltex TUB 121N9000, while having high strain hardening modulus values, which, however, are still lower than those of the inventive examples, demonstrate lower Charpy impact strength. For Eltex TUB 121N6000 also the inferior sagging resistance (as measured by the eta$_{747}$ value) and the inferior rapid crack propagation as measured by the critical temperature $T_{cr}$ (only −4.1° C.) needs to be noted.

2) Polyethylene Composition not Comprising Carbon Black

Polyethylene base resins and compositions according to the invention (IE9 to IE12) and for comparison (CE7 to CE10) were either produced using a Ziegler-Natta catalyst which was prepared according to Example 1 of EP 1 378 528 A1 (catalyst A), or using a similar catalyst B which was prepared as follows:

Complex Preparation:

87 kg of toluene was added into the reactor. Then 45.5 kg Bomag A (Butyloctyl magnesium) in heptane was also added in the reactor. 161 kg 99.8% 2-ethyl-1-hexanol was then introduced into the reactor at a flow rate of 24-40 kg/h. The molar ratio between BOMAG-A and 2-ethyl-1-hexanol was 1:1.83.

Solid Catalyst Component Preparation:

330 kg silica (calcined silica, Sylopol® 2100) and pentane (0.12 kg/kg carrier) were charged into a catalyst preparation reactor. Then EADC (Ethylaluminium dichloride) (2.66 mol/kg silica) was added into the reactor at a temperature below 40° C. during two hours and mixing was continued for one hour. The temperature during mixing was 40-50° C. Then Mg complex prepared as described above was added (2.56 mol Mg/kg silica) at 50° C. during two hours and mixing was continued at 40-50° C. for one hour. 0.84 kg pentane/kg silica was added into the reactor and the slurry was stirred for 4 hours at the temperature of 40-50° C. . . . . Finally, TiCl$_4$ (1.47 mol/kg silica) was added during at least 1 hour at 55° C. to the reactor. The slurry was stirred at 50-60° C. for five hours. The catalyst was then dried by purging with nitrogen.

Molar composition of the ready catalyst is: Al/Mg/Ti=1.5/1.4/0.8 (mol/kg silica).

IE9:

A loop reactor having a volume of 50 dm$^3$ was operated at a temperature of 70° C. and a pressure of 57 bar. Into the reactor were fed ethylene, propane diluent and hydrogen. Also a solid polymerization catalyst component B produced as described above was introduced into the reactor together with triethylaluminium cocatalyst so that the molar ratio of Al/Ti was about 15. The estimated production split was 2 wt. %.

A stream of slurry was continuously withdrawn and directed to a loop reactor having a volume of 150 dm$^3$ and which was operated at a temperature of 95° C. and a pressure of 55 bar. Into the reactor were further fed additional ethylene, propane diluent and hydrogen so that the ethylene concentration in the fluid mixture was 3.9% by mole and the hydrogen to ethylene ratio was 390 mol/kmol. The estimated production split was 16 wt. %. The ethylene homopolymer withdrawn from the reactor had MFR$_2$ of 280 g/10 min.

A stream of slurry from the reactor was withdrawn intermittently and directed into a loop reactor having a volume of 350 dm$^3$ and which was operated at 95° C. temperature and 52 bar pressure. Into the reactor was further added a fresh propane, ethylene, and hydrogen so that the ethylene concentration in the fluid mixture was 3.7 mol-% and the molar ratio of hydrogen to ethylene was 370 mol/kmol. The ethylene homopolymer withdrawn from the reactor had MFR$_2$ of 282 g/10 min. The estimated production split was 27 wt. %.

The slurry was withdrawn from the loop reactor intermittently and directed to a flash vessel operated at a temperature of 50° C. and a pressure of 3 bar. From there the polymer was directed to a fluidized bed gas phase reactor operated at a pressure of 20 bar and a temperature of 85° C. Additional ethylene and 1-hexene comonomer, nitrogen as inert gas and hydrogen were added so that the molar ratio of hydrogen to ethylene was 7 mol/kmol and the molar ratio of 1-hexene to ethylene was 46 mol/kmol. The estimated production split was 55 wt. %. The polymer had a melt flow rate MFR$_5$ of 0.21 g/10 min and a density of 946.6 kg/m$^3$.

IE10 to IE12 and CE7 to CE10:

The procedure of IE9 was repeated by changing catalyst and reactor condition as described in Table 3.

Polymerization conditions and properties of the produced base resins and polyethylene compositions of the inventive and comparative examples are shown in Tables 3 and 4, respectively.

Compounding of the polyethylene composition was done in the following ways:

CE7:

The polymer powder was mixed under nitrogen atmosphere with 3000 ppm of antioxidants, 3000 ppm UV-stabiliser and 400 ppm Ca-stearate. Then it was compounded and extruded under nitrogen atmosphere to pellets by using a JSW CIMP90 twin screw extruder so that the SEI was about 180 kWh/ton and the melt temperature 250° C.

IE9 and CE8:

The polymer powder was mixed under nitrogen atmosphere with 3000 ppm of antioxidants, 2000 ppm UV-stabiliser and 400 ppm Ca-stearate. Then it was compounded and extruded under nitrogen atmosphere to pellets by using a JSW CIMP90 twin screw extruder so that the SEI was about 180 kWh/ton and the melt temperature 250° C.

IE10, IE10a and CE9:

The polymer powder was mixed under nitrogen atmosphere with 1% of orange colour master-batch (pigment orange 72 (2%) and pigment brown 24 (40%) on LDPE carrier), 3000 ppm of antioxidants, 2000 ppm UV-stabiliser and 400 ppm Ca-stearate. Then it was compounded and extruded under nitrogen atmosphere to pellets by using a JSW CIMP90 twin screw extruder so that the SEI was about 180 kWh/ton and the melt temperature 250° C.

IE11, IE12 and CE10:

The polymer powder was mixed under nitrogen atmosphere with 1.9% of blue colour master-batch (pigment blue 29 (4%), pigment blue 15:4 (5%) and pigment white 6 (1%) on LDPE carrier), 3000 ppm of antioxidants, 2000 ppm UV-stabiliser and 400 ppm Ca-stearate. Then it was compounded and extruded under nitrogen atmosphere to pellets by using a JSW CIMP90 twin screw extruder so that the SEI was about 180 kWh/ton and the melt temperature 250° C.

TABLE 3

| Example | IE9 | IE10 | IE10a | IE11 | IE12 | CE7 | CE8 | CE9 | CE10 |
|---|---|---|---|---|---|---|---|---|---|
| Catalyst | A | A | A | A | A | B | A | A | A |
| Prepoly. reactor | | | | | | | | | |
| Temp. (° C.) | 70 | 70 | 70 | 70 | 70 | 70 | 70 | 70 | 70 |
| Press. (kPa) | 5725 | 5725 | 5740 | 5760 | 5755 | 5791 | 5715 | 5755 | 5760 |
| Split (wt. %) | 2 | 2 | 2 | 2 | 2 | 2 | 2 | 2 | 2 |
| First loop reactor | | | | | | | | | |
| Temp. (° C.) | 95 | 95 | 95 | 95 | 95 | 95 | 95 | 95 | 95 |
| Press. (kPa) | 5530 | 5530 | 5550 | 5540 | 5535 | 5590 | 5535 | 5530 | 5540 |
| C2 conc. (mol %) | 3.9 | 3.9 | 3.8 | 3.9 | 3.8 | 4.6 | 3.8 | 3.9 | 3.9 |
| H2/C2 ratio (mol/kmol) | 390 | 385 | 400 | 385 | 385 | 303 | 385 | 385 | 385 |
| Split (wt. %) | 16 | 16 | 16 | 16 | 16 | 23 | 16 | 16 | 16 |
| MFR2 (g/10 min) | 280 | 270 | 290 | 272 | 270 | 304 | 280 | 280 | 260 |
| Second loop reactor | | | | | | | | | |
| Temp. (° C.) | 95 | 95 | 95 | 95 | 95 | 95 | 95 | 95 | 95 |
| Press. (kPa) | 5395 | 5395 | 5400 | 5391 | 5390 | 5198 | 5394 | 5391 | 5391 |
| C2 conc. (mol %) | 3.7 | 3.7 | 3.6 | 3.6 | 3.6 | 2.6 | 3.7 | 3.6 | 3.6 |
| H2/C2 ratio (mol/kmol) | 370 | 370 | 380 | 365 | 365 | 446 | 380 | 375 | 375 |
| Split (wt. %) | 27 | 27 | 27 | 27 | 27 | 24 | 27 | 27 | 27 |
| MFR2 (g/10 min) | 282 | 280 | 292 | 273 | 275 | 420 | 310 | 300 | 300 |
| Gas phase reactor | | | | | | | | | |
| Temp. (° C.) | 80 | 80 | 80 | 80 | 80 | 85 | 80 | 80 | 80 |
| Press. (kPa) | 2002 | 2002 | 2000 | 2000 | 2001 | 2000 | 2002 | 2000 | 2000 |
| H2/C2 ratio (mol/kmol) | 7 | 7 | 7 | 7 | 7 | 10 | 11 | 11 | 11 |
| C6/C2 ratio (mol/kmol) | 46 | 47 | 49 | 46 | 45 | 40 | 36 | 35 | 36 |
| Split (wt. %) | 55 | 55 | 55 | 55 | 55 | 51 | 55 | 55 | 55 |

TABLE 4

| Example | IE9 | IE10 | IE10a | IE11 | IE12 | CE7 | CE8 | CE9 | CE10 |
|---|---|---|---|---|---|---|---|---|---|
| Base resin properties | | | | | | | | | |
| Density [kg/m$^3$] | 946.6 | 946.6 | 946.5 | 946.7 | 946.7 | 950.3 | 949.0 | 949.0 | 949.0 |
| Polyethylene composition properties | | | | | | | | | |
| MFR$_5$ [g/10 min] | 0.21 | 0.2 | 0.25 | 0.21 | 0.22 | 0.29 | 0.22 | 0.22 | 0.22 |
| MFR$_{21}$ [g/10 min] | 6.04 | 6.7 | 7.9 | 5.89 | 6.25 | 10.4 | 6.19 | 6.61 | 6.28 |
| FRR$_{21/5}$ | 28.8 | 33.5 | 31.6 | 28.0 | 28.4 | 35.9 | 28.1 | 30.0 | 28.5 |
| Mn [kg/mol] | 9.2 | | 8.7 | 9.4 | 9.0 | 10.3 | 9.39 | 9.10 | 9.64 |
| Mw [kg/mol] | 275.0 | | 247 | 270.5 | 260.5 | 228.0 | 271.5 | 267.0 | 258.5 |
| Mz [kg/mol] | 1,490 | | 1,235 | 1,470 | 1,455 | 1,225 | 1,455 | 1,350 | 1,360 |
| Mw/Mn | 30 | | 28.3 | 28.9 | 28.9 | 22.1 | 28.9 | 29.3 | 26.8 |
| C6 [mol %] total | 0.53 | | 0.61 | 0.52 | 0.53 | 0.38 | 0.38 | 0.35 | 0.39 |
| C6 in HMW fraction [mol %] | 0.96 | | 1.11 | 0.95 | 0.96 | 0.75 | 0.69 | 0.64 | 0.71 |
| Eta$_{747}$ [kPa*s] | 391.0 | 320.8 | 373.3 | 407.1 | 382.3 | 399.8 | 387.3 | 393.5 | 377.2 |
| SH modulus [MPa] | 95 | 84 | 88 | 88 | 86 | 73.0 | 72 | 73.1 | 69 |
| Density kg/m$^3$ | 948.0 | 951 | 950 | 948.8 | 949.2 | 950.5 | 950.8 | 954.3 | 951.2 |
| SPTR (12.0 MPa/20° C.) [h] | 137 | | 169 | 413 | 771 | 322 | 1,036 | 7115 | 804 |
| SPTR (5.8 MPa/80° C.) [h] | | | | 50 | 120 | | | | |
| SPTR (5.4 MPa/80° C.) [h] | 660 | | 1636 | | | | | | |
| Tc [° C.] | | | −19.8 | | −14.7 | | | | |
| CIS (23° C.) [kJ/m$^2$] | 43.7 | | 41.8 | 40.7 | 40.5 | | | | |
| CIS (−20° C.) [kJ/m$^2$] | 20.1 | | 22.3 | 21 | 20 | | | | |
| PLT+, 32 mm pipe [h] | | | 2329 | | 1036 | | 1179 | 582 | 949 |
| PLT+, 110 mm pipes [h] | | | | | 4083 | | | | |

TABLE 4-continued

| Example | IE9 | IE10 | IE10a | IE11 | IE12 | CE7 | CE8 | CE9 | CE10 |
|---|---|---|---|---|---|---|---|---|---|
| ACT [h] | 3773 | >2680 | 2046 | 4467 | 4174 | 2905 | 2639 | 1807 | 1777 |
| NPT [h] | >6800 | | >5300 | | >7000 | | 7054 | 7978 | 3294 |

IE9 to IE12 demonstrate the combination of excellent slow crack growth resistance (as demonstrated by the strain hardening modulus), while also meeting the requirements of PE100 standard.

This advantageous combination of properties is achieved by the relatively high Mn of the composition, the specific amount of hexene-1 in the high molecular weight fraction, the specific amount (weight fraction) of the high molecular weight fraction, the MFR in the defined range and the specific comonomer used (hexene-1). Comparative Examples 7 to 10 demonstrate that deviation from the proposed polymer structure yield inferior combination of the aforementioned molecular design. CE7 to CE10 contain from 0.64 to 0.75 mol % of hexene-1 in the high Mw fraction, resulting in the immediate reduction of the strain hardening modulus (used as the measure of slow crack growth resistance) as well as ACT and NPT results.

The invention claimed is:

1. A polyethylene composition comprising a base resin which comprises (A) a first ethylene homo- or copolymer fraction, and (B) a second ethylene-hexene-1 copolymer fraction, wherein fraction (A) has a lower molecular weight than fraction (B) and wherein fraction (B) is present in an amount of from 51.0 to 58.5 wt. %, based on the total weight of the base resin, wherein fraction (B) of the base resin has a content of units derived from hexene-1 from 0.80 to 1.45 mol %, wherein the base resin has a number average molecular weight Mn of 8,500 g/mol or higher, wherein the polyethylene composition has a melt flow rate $MFR_5$ from 0.10 to 0.29 g/10 min; and wherein the composition has a Charpy Impact Strength (CIS) at 23° C. of higher than 35 kJ/m².

2. Polyethylene composition according to claim 1 wherein the composition has a strain hardening modulus of 80 MPa or higher.

3. Polyethylene composition according to claim 1 wherein the base resin has a density of at least 945 kg/m³.

4. Polyethylene composition according to claim 1 wherein the base resin has a content of units derived from hexene-1 of 0.44 to 0.70 mol %.

5. Polyethylene composition according to claim 1 wherein the composition also has either a Charpy Impact Strength (CIS) at 0° C. of higher than 22.5 kJ/m², or a Charpy Impact Strength (CIS) at −20° C. of higher than 14.7 kJ/m².

6. Polyethylene composition according to claim 1 wherein fraction (A) of the base resin has an $MFR_2$ as measured in accordance with ISO 1133 of 150 to 600 g/10 min.

7. Polyethylene composition according to claim 2 wherein the polyethylene composition has a critical temperature Tc in the rapid crack propagation test of −10° C. or lower.

8. Polyethylene composition according to claim 1 wherein the composition further comprises carbon black.

9. Polyethylene composition according to claim 8 wherein fraction (B) of the base resin is present in the base resin in an amount of from 54 to 57 wt. %, based on the total weight of the base resin, or wherein the composition has a density of from 953 to 965 kg/m³, or wherein the base resin has a number average molecular weight of 9,000 g/mol or higher.

10. Polyethylene composition according to claim 1 wherein the composition does not comprise carbon black and the base resin has a total content of units derived from hexene-1 of 0.44 to 0.65 mol %.

11. Polyethylene composition according to claim 10 wherein fraction (B) of the base resin is present in the base resin in an amount of from 54 to 57 wt. %, based on the total weight of the base resin, or wherein the composition has a density of from 946 to 955 kg/m³, or wherein the base resin has a number average molecular weight Mn of 9,300 g/mol or higher.

12. A process for producing a polyethylene composition according to claim 10 wherein the base resin is produced in a multi-stage polymerization process in the presence of a Ziegler-Natta catalyst.

13. An article comprising the polyethylene composition according to claim 1.

14. The article according to claim 13 being a pipe or pipe fitting.

15. A method, comprising producing an article using the polyethylene composition of claim 1.

16. The polyethylene composition of claim 1, wherein fraction (B) is present in an amount of from 53.0 to 57.0 wt %.

17. The polyethylene composition of claim 1, wherein fraction (B) of the base resin has a content of units derived from hexene-1 from 0.85 to 1.30 mol %.

18. The polyethylene composition of claim 8, wherein the base resin has a total content of units derived from hexene-1 of 0.50 to 0.70 mol %.

19. The polyethylene composition of claim 8, wherein fraction (B) of the base resin has a content of units derived from hexene-1 from 0.9 to 1.45 mol %.

20. The polyethylene composition of claim 10, wherein the composition does not comprise carbon black and wherein fraction (B) of the base resin has a content of units derived from hexene-1 from 0.8 to 1.35 mol %.

* * * * *